2,980,639
RUBBER COMPOUNDING

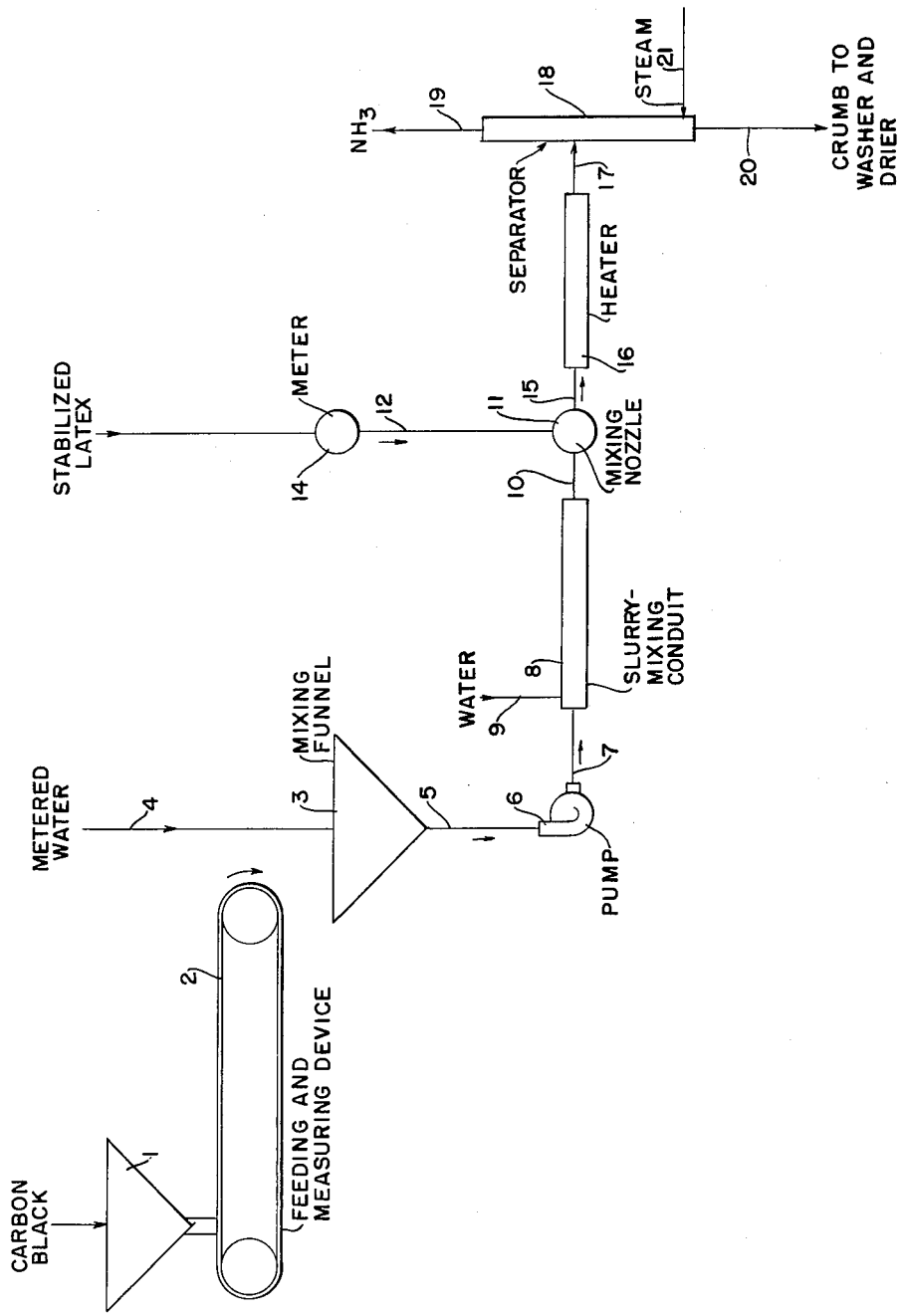

Harold A. Braendle, Garden City, N.Y., assignor to Columbian Carbon Company, New York, N.Y., a corporation of Delaware Filed May 29, 1957, Ser. No. 662,444

3 Claims. (Cl. 260—27)

This invention relates to improvements in rubber compounding and, more particularly, in the compounding of rubber for the manufacture of tire treads and other rubber goods in which the rubber is reinforced by the incorporation of carbon black therein.

Carbon black is extensively used for this purpose. For many years, it has been common practice to mill the dry carbon black into the coagulated rubber by severe mechanical work, as by means of a roll mill or a Banbury mixer. More recently, it has been proposed to disperse the carbon black in the rubber while the latter is in latex form.

Operations of the latter type have involved, as a preliminary step, the forming of an aqueous slurry of the carbon black to be mixed with the latex. A serious difficulty encountered has been that of forming a uniform aqueous carbon black slurry sufficiently stable to avoid precipitation or settling, or otherwise forming localized concentrations of the carbon black, before the slurry could be dispersed in the rubber latex.

In an effort to avoid this difficulty, it has been proposed to incorporate in the aqueous slurry various dispersing or stabilizing agents. Sodium soaps and other metal compounds have been suggested for this purpose. Following mixing of the aqueous slurry with the rubber latex, when such expedients have been employed, a creaming agent is added and, following creaming, the rubber, having the carbon black dispersed therein, is coagulated by the addition of an acid or metal salt and the coagulant is separated from the serum, washed and dried.

The presence of the conventional stabilizing or dispersing agents in the carbon black slurry has been found materially to interfere with the forming of desirable black-rubber crumb, has required the addition of creaming agents and has also required the use of excessively large proportions of the coagulating agent in order to break the emulsion to effect coagulation. Also, in such procedures, excessively large proportions of carbon black have been found to remain in the serum separated from the coagulated rubber. Even more important, appreciable proportions of these slurry stabilizing agents, creaming agents and coagulating agents have been found to be precipitated with the black-rubber, in such a way, that they cannot readily be washed therefrom and deleteriously affect the characteristics of the resultant rubber product.

A further source of deleterious materials in the rubber compound is the metal soap used as the emulsifying agent in the emulsion polymerization process for effecting the synthesis of the rubber. Considerable proportions of such soaps are retained in the resultant rubber latex and are acted upon by the coagulating agent leaving objectionable metal ions in the rubber.

The presence of such metal ions in the rubber has been found to have a detrimental effect upon the wear resistance and other desired properties of rubber compounds, especially those used in the fabrication of tire treads and the like.

It is an object of my present invention to provide a process by which I can avoid, or at least minimize, the presence in rubber compounds of materials and residues of materials which have been shown to detrimentally affect the characteristics of the rubber and, particularly, metal ions and compounds such as previously proposed for the stabilizing of aqueous carbon black slurries, and for creaming and coagulating the black rubber.

This object and other advantages are attained in accordance with my present invention by avoiding or minimizing the use in forming the latex, and in forming the carbon black slurry, of agents which leave objectionable residues in the rubber and avoiding the use of creaming and coagulating agents, as more fully hereinafter described.

In the emulsion polymerization of monomers to form synthetic rubber polymers, it has been customary to use a sodium, or other alkali metal, soap as the emulsifying agent. More recently, it has been proposed to use an ammonium soap for that purpose. These ammonium soaps, and particularly the neutral ammonium soaps, are relatively unstable and especially so at elevated temperatures. It has been found, however, that these neutral ammonium soaps are stabilized by the presence of excess ammonia.

My present invention utilizes, in a novel way, this characteristic of the ammonium soaps to stabilize the polymer emulsion, i.e. latex, until the carbon black has been dispersed therein and thereafter to coagulate the resultant dispersion of carbon black in the latex without the addition of either creaming or coagulating agent.

In accordance with my improved rubber compounding process, I use as the rubber component a latex of the type prepared by emulsion polymerization using an ammonium soap as the emulsifying agent and stabilized by ammonium soap in the presence of excess ammonia. Latices of various types of synthetic rubber polymers, so prepared and stabilized, are well-known and are described, for instance in Patent Nos. 2,461,358, 2,628,956 and 2,680,111, including the well-known GRS and LTP types of synthetic rubber latices.

The coagulation of latices of this type has normally been effected by the addition of the conventionally used acid or salt coagulating agent, the coagulum washed and dried and the carbon black worked into the resultant rubber crumb by dry milling, for instance on a Banbury.

My present invention is applicable generally to latices in the preparation of which an ammonium soap of any of the conventionally used fatty acids or rosin acids, or mixtures thereof, has been used as the emulsifying agent, either alone or in conjunction with an alkali metal soap of such acids, so long as stability of the resultant emulsion is dependent upon the ammonium soap.

However, I use most advantageously a latex in which the ammonium soap is that of a rosin acid, either natural or disproportionate rosin acid, e.g. an abietic acid, hydroabietic acid or dehydroabietic acid, or mixtures of such acids.

In the presence of excess ammonium, these ammonium soaps are relatively stable in their neutral form. But in the absence of the excess ammonia, and especially at an elevated temperature, these neutral ammonium soaps decompose with liberation of the ammonia. I use this stable characteristic of these ammonium soaps in the presence of excess ammonia to maintain stability of the latex while an aqueous carbon black slurry is being dispersed therein, and I use the unstable characteristics of these ammonium soaps to effect coagulation of the carbon-latex mixture by mildly heating the mixture to drive off the ammonia and decompose the soap.

The aqueous carbon black slurry may be prepared by any known method, for instance, by agitating carbon black with water, either with or without a dispersing or slurry stabilizing agent. However, where the slurry is preformed by methods requiring the use of dispersing or stabilizing agents, I use for that purpose an ammonium soap, such as previously described, most advantageously and especially an ammonium soap of the rosin acid type.

In my Patent No. 2,769,795 and in copending application Ser. No. 392,955, filed November 18, 1953, now abandoned, there are described and claimed improved methods and apparatus whereby a uniform, flowing stream of aqueous carbon black slurry is continuously formed by violent hydraulic agitation and impact, or violent shearing action, and the stream of aqueous slurry is as quickly mixed as formed with a stream of the latex, also by violent hydraulic agitation and impact. Where the slurry is thus formed and mixed with the latex, no dispersing or other agent for stabilizing the slurry, and no creaming agent, is required.

The process of my present invention is used with particular advantage in conjunction with the continuous, stream-lined slurry forming and mixing procedure of the said patent and pending application, but, in its broader aspect, its utility is not restricted thereto.

The invention will now be further described and illustrated with reference to the accompanying flow diagram which represents a presently preferred and a particularly advantageous embodiment thereof.

The carbon black selected to be mixed with the rubber, either in beaded or flocculent form, is continuously charged to the system through hopper 1 to a feeding and measuring device indicated at 2, from which it is dropped at a predetermined, constant rate into mixing funnel 3. Suitable automatic feeders for pulverulent materials are well-known to the art, for instance star powder feeders or the so-called Jeffrey Weightrol, and need not here be described. Water is continuously charged to the mixing funnel at a predetermined, constant rate through a conduit represented at 4, and the premixed carbon black and water is continuously passed directly from the funnel, as a flowing stream, through conduit 5 to a pump 6, advantageously of the centrifugal type, and is forced by the pump through conduit 7 into and through slurry-mixing conduit 8.

This slurry-mixing conduit is, with advantage, of the type described and claimed in the said copending application Ser. No. 392,955 which comprises an elongated conduit of uniform and relatively small cross-sectional area through which the carbon black-water mixture is passed as a flowing stream while being subjected to the action of a multiplicity of rapidly rotating blades having sharp forward edges, and rotating at a tip velocity of at least 3500 feet per minute, coaxially mounted to rotate out of contact with other solid surfaces and spaced apart over the length of the conduit, while inhibiting mass rotation of the stream with the rotating blades.

In using a mixing conduit of the type just described, all of the water may be premixed with the carbon black or a portion thereof may be separately introduced into the upstream end of the mixing condiut through conduit 9.

The resultant uniform stream of aqueous carbon black slurry is passed from the downstream end of the mixing conduit through conduit 10 to mixing nozzle 11, in which the slurry stream is subjected to hydraulic agitation and impact with a stream of latex, of the type previously described, injected into the mixing nozzle through conduit 12 at a predetermined rate indicated and controlled by metering device indicated at 14.

The resultant uniform mixture of latex and carbon black slurry is passed directly from the mixing nozzle through conduit 15 to a heater indicated at 16, wherein the latex mixture is heated to a temperature sufficiently high to cause rapid elimination of the excess ammonia and decomposition of the neutral ammonium soap upon release from the heater.

The heated latex mixture passes from the heater through conduit 17 into an ammonia separating chamber 18, in which the ammonia is flashed off, and passes from the separating chamber through conduit 19 to a conventional ammonia recovery system.

With elimination of the excess ammonia and decomposition of the stabilizing ammonium soap, coagulation of the rubber, having the carbon black dispersed therein, results. The resultant rubber crumb is withdrawn from the separating chamber through line 20 and is passed to conventional washing and drying operations.

Various methods and means may be used for the heating of the latex. For instance, it may be subjected to either direct or indirect heat exchange with steam or other inert hot gases. Or the latex mixture may be heated by passing it through an externally heated drum. As a further alternative, the heating and separation of ammonia may be simultaneously affected by spray-drying the mixture or otherwise passing it downwardly in finely divided form through a heated chamber, the ammonia being withdrawn from the upper end of the chamber and the coagulated rubber withdrawn from the lower end thereof.

Steam or other hot inert gas may, with advantage, be introduced into the lower end of the ammonia separating chamber, as indicated at 21, to assist in the separation of ammonia from the latex mixture.

In heating the latex mixture, care must be exercised to avoid temperatures known to be detrimental to the rubber polymers. This maximum temperature will vary somewhat depending upon the particular type of polymer being used, as is well-known to rubber compounders. Likewise, the minimum temperature effective to decompose the stabilizing ammonium soap may be varied somewhat, depending upon the particular type of ammonium soap present. In most instances, temperatures of about 100° C. are effective for this purpose.

In that aspect of my invention just described, the use of slurry stabilizing agents is entirely avoided and the use of conventional creaming agents and coagulating agents is likewise rendered unnecessary, and consequently the resultant rubber crumb is free from such materials. The presence in the rubber crumb of sodium ions may be entirely avoided, or at least material decreased.

The presence of rosin acids and rosin acid soaps in rubber compositions, even in quite substantial proportions, has been found to beneficially affect the characteristics of the rubber. Consequently, any ammonium rosin soap residues remaining in the rubber crumb are unobjectionable.

In accordance with one advantageous aspect of the invention, additional rosin acids or rosin soaps of the type described, may be introduced into the latex mixture together with the aqueous carbon black slurry by using such rosin materials as a stabilizing or dispersing agent for the slurry. Even in operations of the type represented by the flow diagram, in which no slurry stabilizing agent is required, rosin acids or ammonium rosin soaps may be incorporated in the rubber crumb by mixing them with the aqueous carbon black slurry, advantageously in emulsion form, either in the process of forming the slurry or thereafter, prior to mixing the slurry with the latex.

Where desired, various other rubber compounding agents, such as extender oils or the like, may be premixed with the latex prior to the mixing of the latex with the carbon black slurry or may be premixed with the carbon black slurry. It is important, however, that any such materials premixed with the latex must be of such nature as not to cause premature coagulation of the polymers.

The proportion of water used in making the carbon black slurry is subject to considerable variation but I have, with particular advantage, used for this purpose about 10–11 parts of water per part of carbon black, by weight.

The invention will be further illustrated by the following specific examples:

Example I

The aqueous carbon black slurry is prepared by premixing water and carbon black in proportions of 11 parts of water per part of carbon black, by weight, and agitating the mixture with 2% of ammonium rosin soap, based on the weight of the black. This slurry is charged at a uniform rate of 12,000 pounds per hour to a 3-fluid eductor. A latex of the L.T.P. type, prepared by the emulsion polymerization of butadiene and styrene using ammonium rosin soap as the emulsifying agent, as described for instance in Patent No. 2,680,111, and stabilized by adding thereto three parts of ammonia per 100 parts of polymer to maintain stability, is charged to the 3-fluid eductor at a uniform rate of 10,500 pounds per hour. Steam, at a pressure of 50 pounds per square inch, is used as the eductor gas to effect violent agitation and mixing of the slurry and latex. The mixture is thereafter quickly heated to a temperature of 80° C. and the ammonia flashed off, causing coagulation, and the resultant crumb is separated from the serum, washed and dried.

Example II

This operation is carried out substantially identically to that of Example I, except that the aqueous carbon black slurry is continuously produced as a flowing stream in a slurry mixing conduit of the type more particularly heretofore described, no dispersing agent or slurry stabilizing agent being used.

The process is applicable to use with any of the various types of rubber-reinforcing carbon blacks. As previously noted, it is applicable to any of the various types of synthetic rubber polymers stabilized with ammonium soap as previously described herein.

I claim:

1. In the process for producing dispersions of carbon black in rubber in which the black is mixed with the rubber while in latex form and the carbon black-latex mixture thereafter coagulated, the improvement comprising the following steps in sequence, continuously charging the carbon black and water in uniform, predetermined proportions to a mixing chamber, subjecting the black-water mixture in the chamber to violent hydraulic agitation and impact and thereby forming a continuously flowing, confined stream of aqueous carbon black slurry of uniform composition, continuously mixing the resultant stream of slurry, before any separation or localized concentration of the carbon black can occur therein, in uniform predetermined proportions, by violent hydraulic turbulence and impact, with a stream of a synthetic polymeric diolefin rubber latex which has been produced by emulsion polymerization using a soap from the class consisting of ammonium soaps of fatty acids and ammonium soaps of rosin acids as the emulsifying agent and stabilized by the presence therein of ammonium soap and excess ammonia, and effecting the coagulation of the resultant mixture by heating the mixture sufficiently high to drive off the excess ammonia and decompose the ammonium soap present therein, but below that at which the rubber of the latex is detrimentally affected, and liberating the ammonia resulting from the decomposition of the ammonium soap from the mixture, thereby forming crumb rubber having the carbon black dispersed therein.

2. The process of claim 1 in which the ammonium soap is an ammonium soap of a rosin acid.

3. The process of claim 1 in which the coagulation of the carbon black-latex mixture is effected by heating the mixture to a temperature of about 80°–100° C.

References Cited in the file of this patent

UNITED STATES PATENTS

| | | |
|---|---|---|
| 1,798,253 | Gibbons | Mar. 31, 1931 |
| 1,802,761 | Gibbons | Apr. 28, 1931 |
| 2,376,281 | Schott et al. | May 15, 1945 |
| 2,680,111 | Brown | June 1, 1954 |
| 2,769,795 | Braendle | Nov. 6, 1956 |
| 2,776,953 | Taves | Jan. 8, 1957 |

FOREIGN PATENTS

| | | |
|---|---|---|
| 250,623 | Great Britain | Apr. 13, 1926 |

OTHER REFERENCES

Hercules: Rosin Amine D and Its Derivatives, pp. 24–27, Hercules Powder Co. (1952).

Whitby: Synthetic Rubber, pages 249–251, 657, John Wiley (1954).